(No Model.)
C. M. BLYDENBURGH.
SHIFTING SEAT FOR VEHICLES.
No. 428,062. Patented May 20, 1890.
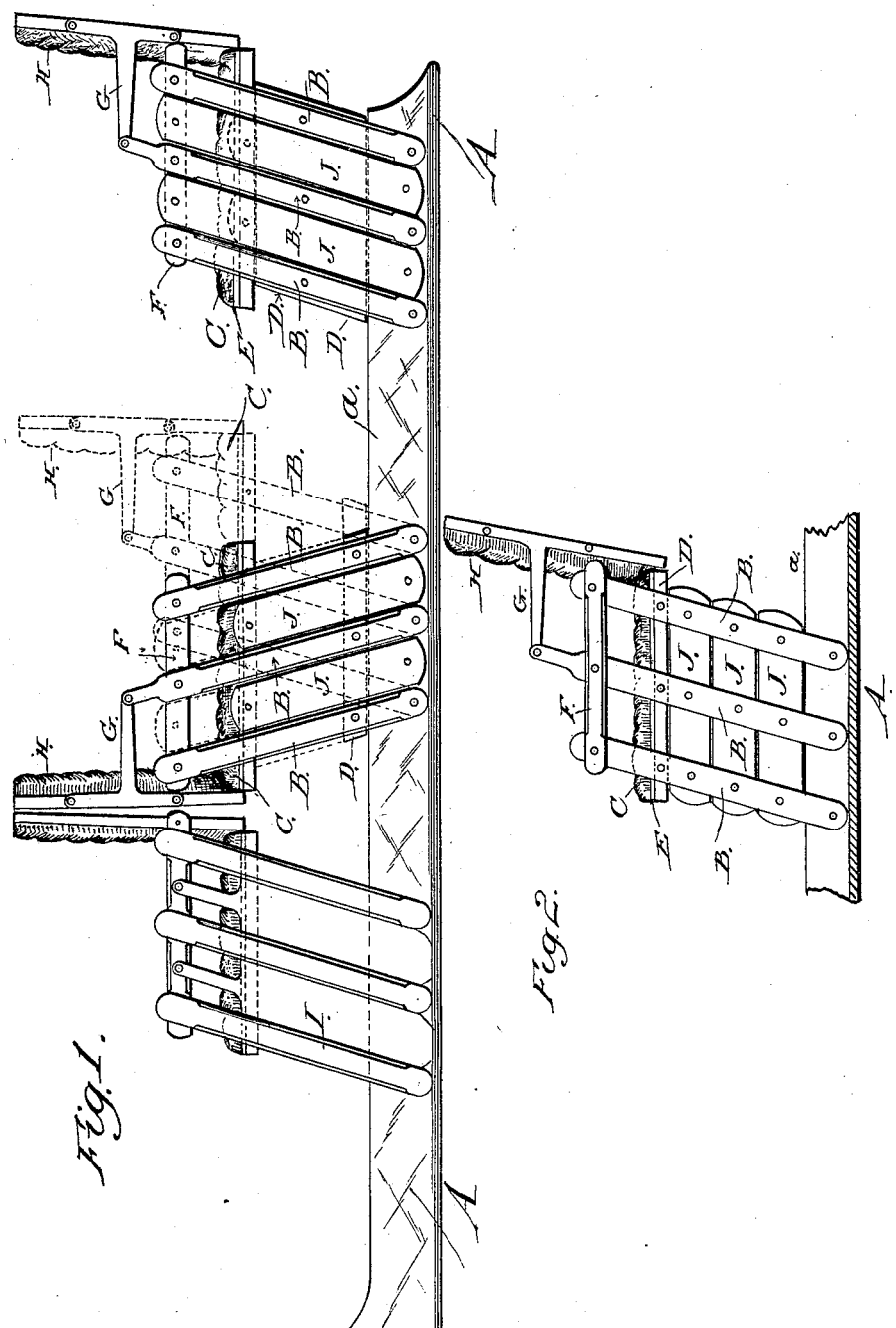
WITNESSES
T. W. Fowler,
W. H. Patterson
INVENTOR
Charles M. Blydenburgh,
by A. H. Evans & Co
Attorneys

UNITED STATES PATENT OFFICE.

CHARLES M. BLYDENBURGH, OF RIVERHEAD, NEW YORK.

SHIFTING SEAT FOR VEHICLES.

SPECIFICATION forming part of Letters Patent No. 428,062, dated May 20, 1890.

Application filed February 24, 1890. Serial No. 341,469. (No model.)

*To all whom it may concern:*

Be it known that I, CHARLES M. BLYDENBURGH, a citizen of the United States, residing at Riverhead, in the county of Suffolk and State of New York, have invented certain new and useful Improvements in Vehicles, of which the following is a full and clear description, reference being had to the accompanying drawings, forming part of this specification, in which—

Figure 1 represents a side elevation of a vehicle embodying my invention. Fig. 2 is a modification of the same.

My invention relates to certain improvements in vehicles, and especially in the seats and seat-supports therefor; and my invention consists in the construction and combination of parts which I shall hereinafter fully describe and claim.

To enable others skilled in the art to which my invention appertains to make and use the same, I will now describe its construction and indicate the manner in which I have carried the invention out.

In the drawings, A represents the body portion, which may be of any desired form and construction, and may have either high or low side rails $a$, or be otherwise constructed to suit the necessities or tastes in each particular case.

To the inner or outer walls of the side rails $a$, but preferably to the outer walls, I pivotally secure the lower ends of parallel bars B, which form the support for the seat C, these bars being connected together at points between their upper and lower ends by means of bars D, which may be narrow or wide, and are designed to have the frame E of the seat bolted or otherwise secured to it to secure the seat in position and to assist in preventing the spreading of the parallel bars.

The parallel bars are arranged at the opposite sides of the body A, and their upper ends are pivotally secured to bars F, which unite these ends and form a finish at the top of the seat-support, and also may serve as arm-rests, while one of the parallel bars at each side may be extended to form a support to which the arms G of the lazy-back H are pivotally secured, thus rendering the lazy-back capable of being reversed for the purpose hereinafter stated, the said lazy-back and seat being upholstered or not, as desired.

The arrangement of seats may be such as to adapt them to a three-seat vehicle, in which case the front seat-support I will be a fixed one and will have its support stationary and preferably made as much after the design of the adjustable rear seats as possible to enhance the general appearance of the vehicle, or the front seat may be used with a single rear seat, which, when constructed with a pivoted support, as previously described, permits this rear seat to be moved about its center of motion to shift the position of the seat portion proper with relation to the fixed front seat. In other words, the arrangement of seats and the number of seats may be varied without departing from the spirit of my invention, which relates, essentially, to the construction of the adjustable seat-support. To constitute a means for holding the parallel bars of the seat-support against further movement after being once adjusted, whereby a firm support is given the seat proper, I may use the bars D, which are secured to the parallel bars, in which case these bars will rest their lower faces against the upper faces of the side rails of the body portion, as shown in the drawings, or I may use what I consider a preferred construction, which consists in employing other bars J and placing them between the parallel bars C, with their lower ends pivotally held to the body portion of the vehicle and their upper ends likewise held to the bars F or to the bars which support the seat. These supplemental bars J about occupy the space between the parallel bars C when the seat is in its adjusted position, and thereby prevent any further movement of the parallel bars. Each seat-support is therefore firmly held, and the strain due to the weight of the occupant upon the seat is removed from the pivots upon which the parallel bars turn.

In three-seat vehicles, when it is desired that the occupants of the rear seats shall face each other, the middle seat or the one immediately back of the stationary front seat is moved so that the parallel bars of its support will incline upwardly and toward the back of the front seat, as shown by the full lines in the drawings, thereby about filling the space between the stationary seat and middle seat. This arrangement provides considerable space between the middle seat and the rear seat and permits both seats to be occupied without incommoding the occupants of either, and also enables the occupants to enter and leave the vehicle at the side without danger of soiling their clothes by contact with the wheels. When the middle seat is thrown back into the dotted position shown, it is obvious that the occupants of all of the seats face toward the front of the vehicle, and the space between the front seat and middle seat and between this latter seat and the rear seat will be about equal, thereby greatly adding to the symmetry of the vehicle and providing sufficient space between the middle seat and back of the front seat to provide for the comfort of the occupants of the middle seat. The rear seat, being constructed like the middle seat, is also capable of adjustment to permit this seat to face the front, as described, or to face the rear, in which latter case sufficient space is left between the rear seat and back of the vehicle to enable the occupant of this seat to enter and leave the vehicle from the rear. Each adjustable seat is, as before stated, provided with a pivoted lazy-back, which may be turned about its pivoted center to correspond with the adjusted positions of the seats.

A vehicle embodying the construction described is capable of having its seats adjusted to suit almost any fancy or circumstance, and the construction and arrangement of parts is such that the adjustments may be made and retained without the employment of bolts, rods, or other securing means other than the supplemental bars J or the bars D, which are adjusted to rest upon the tops of the side rails of the body portion.

If desired, the supplemental bars J may be arranged transversely of the parallel bars and parallel with the bars D without departing from the spirit of my invention. This construction is shown in Fig. 2 and accomplishes the same purposes as those described for the construction shown in Fig. 1.

Having thus described my invention, what I claim as new, and desire to secure by Letters Patent, is—

1. A vehicle-seat support consisting of a series of parallel bars having pivoted centers of movement, a second series of parallel bars pivoted transversely to said first series, and a third series of intermediate bars adapted to limit the forward and rear movements of said support by occupying the spaces between the other series of bars, substantially as herein described.

2. A vehicle-seat support or body consisting of a series of parallel bars having pivoted centers of movement, a second series of bars pivoted transversely to and movable with the bars of the first series, and a third series of bars placed in the spaces between either of the other series and adapted to limit the forward and rear movements of said support or body by occupying said spaces, substantially as herein described.

3. A vehicle-seat support consisting of a series of parallel bars having pivotal centers of movement, a second series of bars pivoted transversely to the bars of the first series, a third series of bars placed between the bars of the other series, and a reversible lazy-back pivoted to the extended portions of the middle bars of the first series, substantially as herein described.

4. A vehicle-seat support consisting, essentially, of parallel bars pivoted at top and bottom, a seat supported upon said bars, a pivoted and reversible lazy-back, and pivotally-secured bars moving with the parallel bars for limiting the movement of said bars.

5. A seat-support consisting, essentially, of parallel bars pivoted at their tops and bottoms and at points intermediate thereto, pivoted supplemental bars occupying the spaces between the parallel bars and serving to limit the movements of said bars, a seat-frame carried by the pivoted bars, and a pivoted and reversible lazy-back, substantially as described.

6. The combination, with a stationary front seat, of seats in rear thereof having their supports consisting of parallel bars pivoted at their upper and lower ends, whereby said seats may be adjusted horizontally toward and from each other, pivoted and reversible lazy-backs carried by the supports, and pivoted bars between the parallel bars and movable therewith, said intermediate bars limiting the movements of the parallel bars and serving as braces therefor, substantially as described.

CHARLES M. BLYDENBURGH.

Witnesses:
T. WALTER FOWLER,
W. H. PATTERSON.